United States Patent [19]
Zwack et al.

[11] Patent Number: 5,948,229
[45] Date of Patent: *Sep. 7, 1999

[54] ELECTRODEPOSITABLE COATING COMPOSITIONS HAVING IMPROVED CURE RESPONSE

[75] Inventors: Robert R. Zwack; V. Eswarakrishnan, both of Allison Park; Edward R. Coleridge, Lower Burrell; Gregory J. McCollum, Gibsonia, all of Pa.

[73] Assignee: PPG Industries Ohio, Inc., Cleveland, Ohio

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/820,827

[22] Filed: Mar. 19, 1997

Related U.S. Application Data

[63] Continuation of application No. 08/329,106, Oct. 25, 1994, abandoned.

[51] Int. Cl.$^6$ ...................................................... C08J 3/00
[52] U.S. Cl. ......................... 204/502; 204/506; 524/591; 524/270; 524/839; 524/840; 523/414; 523/415
[58] Field of Search .................................... 523/415, 414; 204/502, 506; 524/591, 270, 839, 840; 528/45, 49, 58

[56] References Cited

U.S. PATENT DOCUMENTS

| | | | |
|---|---|---|---|
| 3,793,278 | 2/1974 | De Bona | 260/29.2 EP |
| 3,959,106 | 5/1976 | Bosso et al. | 204/181 |
| 3,984,299 | 10/1976 | Jerabek | 204/181 |
| 4,007,154 | 2/1977 | Schimmel et al. | 260/37 EP |
| 4,104,147 | 8/1978 | Marchetti et al. | 204/181 C |
| 4,148,772 | 4/1979 | Marchetti et al. | 260/29.2 EP |
| 4,252,734 | 2/1981 | Barry et al. | 260/404.5 |
| 4,278,580 | 7/1981 | Schmolzer et al. | 260/29.2 EP |
| 4,423,166 | 12/1983 | Moriarity et al. | 523/414 |
| 4,433,078 | 2/1984 | Kersten et al. | 523/404 |
| 4,468,307 | 8/1984 | Wismer et al. | 204/181 |
| 4,575,524 | 3/1986 | Anderson et al. | 523/455 |
| 4,579,886 | 4/1986 | Otsuki et al. | 523/415 |
| 4,879,325 | 11/1989 | Kimura et al. | 523/404 |
| 4,891,111 | 1/1990 | McCollum et al. | 204/181.7 |
| 4,931,157 | 6/1990 | Valko et al. | 204/181.7 |
| 4,978,728 | 12/1990 | Nichols et al. | 525/528 |
| 5,059,293 | 10/1991 | Sugishima et al. | 204/181.7 |
| 5,066,689 | 11/1991 | Patzschke et al. | 523/415 |
| 5,089,583 | 2/1992 | Nichols et al. | 528/58 |
| 5,089,584 | 2/1992 | Nichols et al. | 528/58 |
| 5,096,556 | 3/1992 | Corrigan et al. | 204/181.7 |
| 5,145,976 | 9/1992 | Nichols et al. | 556/88 |
| 5,283,124 | 2/1994 | Fujibayashi et al. | 523/404 |
| 5,356,529 | 10/1994 | Eswarakrishnan et al. | 205/224 |
| 5,430,078 | 7/1995 | Hoppe-Hoeffler et al. | 523/414 |
| 5,767,191 | 6/1998 | Zawacky et al. | 524/415 |

FOREIGN PATENT DOCUMENTS

| | | |
|---|---|---|
| 2010820 | 8/1991 | Canada . |
| 0 262 772 | 4/1988 | European Pat. Off. . |
| 0 262 772 A3 | 4/1988 | European Pat. Off. . |
| 0 423 642 | 4/1991 | European Pat. Off. . |
| 0 423 643 | 4/1991 | European Pat. Off. . |
| 6-57184 | 3/1994 | Japan . |

OTHER PUBLICATIONS

Polyurethanes Chemistry and Technology; Part I. Chemistry; Saunders et al., pp. 213, 228 (No Month and Year Available).

Chemical Principals, Saunders College Publishers, 1981, pp. 406–407.

PCT International Search Report, Feb. 1996.

Austrian Search Report for Turkish patent application 95/01310 dated Aug. 1996.

Mastertons et al. "Chemical Principles", Saunders College Publishers, 5th Edition, 1981, pp. 406–407 and 410–411.

*Primary Examiner*—Kishor Mayekar
*Attorney, Agent, or Firm*—William J. Uhl; Kenneth J. Stachel

[57] ABSTRACT

An improved electrodepositable composition is provided comprising: (a) an active hydrogen-containing cationic resin electrodepositable on a cathode; (b) a capped polyisocyanate curing agent; and (c) an organotin-containing catalyst. The improvement comprises the addition to the electrodepositable composition of a water immiscible acid functional compound having a hydrocarbon chain of at least 5 carbon atoms. The composition provides improved cure response and appearance properties when electrodeposited over conductive substrates.

21 Claims, No Drawings

ELECTRODEPOSITABLE COATING COMPOSITIONS HAVING IMPROVED CURE RESPONSE

This application is a continuation of application Ser. No. 08/329,106, filed Oct. 25, 1994 now abandoned.

BACKGROUND OF THE INVENTION

1. Field of the Invention

The present invention relates to cationic electrodepositable compositions, and to their use in electrodeposition.

2. Brief Description of the Prior Art

The application of a coating by electrodeposition involves depositing a film-forming composition to an electrically conductive substrate under the influence of an applied electrical potential. Electrodeposition has gained prominence in the coatings industry because in comparison with non-electrophoretic coating methods, electrodeposition provides higher paint utilization, outstanding corrosion resistance, and low environmental contamination. Early attempts at commercial electrodeposition processes used anionic electrodeposition, where the workpiece being coated served as the anode. However, in 1972, cationic electrodeposition was introduced commercially. Since that time, cationic electrodeposition has become increasingly popular and today is the most prevalent method of electrodeposition. Throughout the world, more than 80 percent of all motor vehicles manufactured are given a primer coating by cationic electrodeposition.

Many cationic electrodeposition compositions used today are based on active hydrogen-containing resins derived from a polyepoxide and a capped polyisocyanate curing agent. These cationic electrodeposition compositions contain organic tin catalysts such as dibutyl tin oxide to activate cure of the electrodeposition composition. Because of cost and environmental considerations, the levels of these tin catalysts are kept low. Organotin catalysts are relatively expensive and appear in the ultrafiltrate of electrodeposition baths, which can present waste disposal problems. However, low catalyst levels may lessen the cure response of a coating composition, providing weaker properties in the cured film than desired. Appearance of the cured film may also be adversely affected.

It would be desirable to provide an electrodepositable composition which demonstrates enhanced cure response at low organotin catalyst levels without loss of cured film properties or appearance.

SUMMARY OF THE INVENTION

In accordance with the present invention, an improved electrodepositable composition and a method of electrodeposition using the composition are provided. The electrodepositable composition comprises (a) an active hydrogen-containing cationic resin electrodepositable on a cathode; (b) a capped polyisocyanate curing agent; and (c) an organotin-containing catalyst. The improvement comprises the addition to the electrodepositable composition of a water immiscible acid functional compound having a hydrocarbon chain of at least 5 carbon atoms.

DETAILED DESCRIPTION

The cationic resin of the present invention is preferably derived from a polyepoxide and can be prepared by reacting together a polyepoxide and a polyhydroxyl group-containing material selected from alcoholic hydroxyl group-containing materials and phenolic hydroxyl group-containing materials to chain extend or build the molecular weight of the polyepoxide. The reaction product can then be reacted with a cationic salt group former to produce the cationic resin.

A chain extended polyepoxide is typically prepared as follows: the polyepoxide and polyhydroxyl group-containing material are reacted together neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is typically conducted at a temperature of about 80° C. to 160° C. for about 30 to 180 minutes until an epoxy group-containing resinous reaction product is obtained.

The equivalent ratio of reactants; i. e., epoxy:polyhydroxyl group-containing material is typically from about 1.00:0.50 to 1.00:2.00.

The polyepoxide preferably has at least two 1,2-epoxy groups. In general the epoxide equivalent weight of the polyepoxide will range from 100 to about 2000, typically from about 180 to 500. The epoxy compounds may be saturated or unsaturated, cyclic or acyclic, aliphatic, alicyclic, aromatic or heterocyclic. They may contain substituents such as halogen, hydroxyl, and ether groups.

Examples of polyepoxides are those having a 1,2-epoxy equivalency greater than one and preferably about two; that is, polyepoxides which have on average two epoxide groups per molecule. The preferred polyepoxides are polyglycidyl ethers of polyhydric alcohols such as cyclic polyols. Particularly preferred are polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Besides polyhydric phenols, other cyclic polyols can be used in preparing the polyglycidyl ethers of cyclic polyols. Examples of other cyclic polyols include alicyclic polyols, particularly cycloaliphatic polyols such as 1,2-cyclohexane diol and 1,2-bis(hydroxymethyl)cyclohexane. The preferred polyepoxides have epoxide equivalent weights ranging from about 180 to 2000, preferably from about 186 to 1200. Epoxy group-containing acrylic polymers can also be used. These polymers typically have an epoxy equivalent weight ranging from about 750 to 2000.

Examples of polyhydroxyl group-containing materials used to chain extend or increase the molecular weight of the polyepoxide (i. e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used. Bisphenol A is preferred.

The active hydrogens associated with the cationic resin include any active hydrogens which are reactive with isocyanates within the temperature range of about 93 to 204° C., preferably about 121 to 177° C. Typically, the active hydrogens are selected from the group consisting of aliphatic hydroxyl and primary and secondary amino, including mixed groups such as hydroxyl and primary amino. Preferably, the cationic resin will have an active hydrogen content of about 1 to 4 millequivalents, more preferably about 2 to 3 millequivalents of active hydrogen per gram of resin solids.

The resin contains cationic salt groups, which are preferably incorporated into the resin molecule as follows: The resinous reaction product prepared as described above is further reacted with a cationic salt group former. By "cationic salt group former" is meant a material which is reactive with epoxy groups and which can be acidified before, during, or after reaction with the epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

When amines are used as the cationic salt formers, monoamines are preferred, and hydroxyl-containing amines are particularly preferred. Polyamines may be used but are not recommended because of a tendency to gel the resin.

Tertiary and secondary amines are preferred to primary amines because primary amines are polyfunctional with respect to epoxy groups and have a greater tendency to gel the reaction mixture. If polyamines or primary amines are used, they should be used in a substantial stoichiometric excess to the epoxy functionality in the polyepoxide so as to prevent gelation and the excess amine should be removed from the reaction mixture by vacuum stripping or other technique at the end of the reaction. The epoxy may be added to the amine to ensure excess amine.

Examples of hydroxyl-containing amines are alkanolamines, dialkanolamines, trialkanolamines, alkyl alkanolamines, and aralkyl alkanolamines containing from 1 to 18 carbon atoms, preferably 1 to 6 carbon atoms in each of the alkanol, alkyl and aryl groups. Specific examples include ethanolamine, N-methylethanolamine, diethanolamine, N-phenylethanolamine, N,N-dimethylethanolamine, N-methyldiethanolamine, triethanolamine and N-(2-hydroxyethyl)-piperazine.

Amines such as mono, di, and trialkylamines and mixed aryl-alkyl amines which do not contain hydroxyl groups or amines substituted with groups other than hydroxyl which do not negatively affect the reaction between the amine and the epoxy may also be used. Specific examples include ethylamine, methylethylamine, triethylamine, N-benzyldimethylamine, dicocoamine and N,N-dimethylcyclohexylamine.

Mixtures of the above mentioned amines may also be used.

The reaction of a primary and/or secondary amine with the polyepoxide takes place upon mixing of the amine and polyepoxide. The amine may be added to the polyepoxide or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature of about 50 to 150° C. may be done to hasten the reaction.

The reaction product of the primary and/or secondary amine and the polyepoxide is made cationic and water dispersible by at least partial neutralization with an acid. Suitable acids include organic and inorganic acids such as formic acid, acetic acid, lactic acid, phosphoric acid and sulfamic acid. By sulfamic acid is meant sulfamic acid itself or derivatives thereof; i. e., an acid of the formula:

wherein R is hydrogen or an alkyl group having 1 to 4 carbon atoms. Sulfamic acid is preferred. Mixtures of the above mentioned acids may also be used.

The extent of neutralization varies with the particular reaction product involved. However, sufficient acid should be used to disperse the electrodepositable composition in water. Typically, the amount of acid used provides at least 20 percent of all of the total neutralization. Excess acid may also be used beyond the amount required for 100 percent total neutralization.

In the reaction of a tertiary amine with a polyepoxide, the tertiary amine can be prereacted with the neutralizing acid to form the amine salt and then the amine salt reacted with the polyepoxide to form a quaternary salt group-containing resin. The reaction is conducted by mixing the amine salt with the polyepoxide in water. Typically the water is present in an amount ranging from about 1.75 to about 20 percent by weight based on total reaction mixture solids.

In forming the quaternary ammonium salt group-containing resin, the reaction temperature can be varied from the lowest temperature at which the reaction will proceed, generally room temperature or slightly thereabove, to a maximum temperature of about 100° C. (at atmospheric pressure). At higher pressures, higher reaction temperatures may be used. Preferably the reaction temperature is in the range of about 60 to 100° C. Solvents such as a sterically hindered ester, ether, or sterically hindered ketone may be used, but their use is not necessary.

In addition to the primary, secondary, and tertiary amines disclosed above, a portion of the amine that is reacted with the polyepoxide can be a ketimine of a polyamine, such as is described in U.S. Pat. No. 4,104,147, column 6, line 23 to column 7, line 23. The ketimine groups decompose upon dispersing the amine-epoxy resin reaction product in water.

In addition to resins containing amine salts and quaternary ammonium salt groups, cationic resins containing ternary sulfonium groups may be used in the composition of the present invention. Examples of these resins and their method of preparation are described in U.S. Pat. Nos. 3,793,278 to DeBona and 3,959,106 to Bosso et al.

The extent of cationic salt group formation should be such that when the resin is mixed with an aqueous medium and other ingredients, a stable dispersion of the electrodepositable composition will form. By "stable dispersion" is meant one that does not settle or is easily redispersible if some settling occurs. Moreover, the dispersion should be of sufficient cationic character that the dispersed resin particles will migrate toward and electrodeposit on a cathode when an electrical potential is set up between an anode and a cathode immersed in the aqueous dispersion.

Generally, the cationic resin in the electrodepositable composition of the present invention contains from about 0.1 to 3.0, preferably from about 0.1 to 0.7 millequivalents of cationic salt group per gram of resin solids. The cationic resin is preferably non-gelled, having a number average molecular weight ranging from about 2000 to about 15,000, preferably from about 5000 to about 10,000. By "non-gelled" is meant that the resin is substantially free from crosslinking, and prior to cationic salt group formation, the resin has a measurable intrinsic viscosity when dissolved in a suitable solvent. In contrast, a gelled resin, having an essentially infinite molecular weight, would have an intrinsic viscosity too high to measure.

The electrodepositable composition of the present invention also contains a capped polyisocyanate curing agent. The polyisocyanate curing agent may be a fully capped polyisocyanate with substantially no free isocyanate groups, or it may be partially capped and reacted with the resin backbone as described in U.S. Pat. No. 3,984,299. The polyisocyanate can be an aliphatic or an aromatic polyisocyanate or a mixture of the two. Diisocyanates are preferred, although higher polyisocyanates can be used in place of or in combination with diisocyanates.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4',4"-triisocyanate, 1,2,4-benzene triisocyanate and polymethylene polyphenyl isocyanate.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used. A mixture of diphenylmethane-4,4'-diisocyanate and polymethylene polyphenyl isocyanate is preferred.

Any suitable aliphatic, cycloaliphatic, or aromatic alkyl monoalcohol may be used as a capping agent for the polyisocyanate in the composition of the present invention including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol. Glycol ethers may also be used as capping agents. Suitable glycol ethers include ethylene glycol butyl ether, diethylene glycol butyl ether, ethylene glycol methyl ether and propylene glycol methyl ether. Diethylene glycol butyl ether is preferred among the glycol ethers.

Other suitable capping agents include oximes such as methyl ethyl ketoxime, acetone oxime and cyclohexanone oxime and lactams such as epsilon-caprolactam.

The polyisocyanate curing agent is usually present in the electrodepositable composition in an amount ranging from about 5 to 60 percent by weight, preferably from about 25 to 50 percent by weight based on total weight of resin solids.

Organotin catalysts are also present in the electrodepositable composition of the present invention, preferably in the form of a dispersion. The catalysts, which are often solids, are typically dispersed in a conventional pigment grinding vehicle such as those disclosed in U.S. Pat. No. 4,007,154, by a grinding or milling process. The catalysts are typically used in amounts of about 0.05 to 1 percent by weight tin based on weight of resin solids. Suitable catalysts include dioctyltin oxide and dibutyltin oxide.

At low organic tin levels in conventional systems, the appearance of the cured coating can be a problem. The presence of the acid functional compound in the electrodepositable composition allows for the use of relatively low levels of organic tin catalyst; i. e., from about 0.05 to 0.5 percent tin by weight based on weight of resin solids, with good cure response and appearance properties.

The acid functional compound added to the electrodepositable composition of the present invention is water immiscible so as to be electrodepositable on the cathode, and has a hydrocarbon chain (excluding carbon atoms associated with the acid functionality) of at least 5 carbon atoms, preferably from about 5 to about 34 carbon atoms, more preferably from about 9 to about 34 carbon atoms, and most preferably about 15 to 19 carbon atoms.

Preferred acid functional compounds are carboxylic acids. The acid functional compound may contain more than one acid functional group. The hydrocarbon chain of the acid functional compound may be aliphatic or aromatic, may be saturated or unsaturated, and may be branched or linear. The hydrocarbon chain of the acid functional compound may also be substituted. Examples of substituents include hydroxyl groups. Examples of aliphatic saturated carboxylic acids include isodecanoic acid, lauric acid, hexanoic acid, dimer fatty acid, and stearic acid. Examples of aliphatic unsaturated carboxylic acids include oleic acid, 9–11 octadecadienoic acid, 9–12 octadecadienoic acid (linoleic acid), linolenic acid, and mixtures thereof. Examples of substituted carboxylic acids include 12-hydroxy stearic acid. Oleic acid is preferred.

The acid functional compound may be incorporated into the electrodepositable composition in several ways. It may be added to the final reaction mixture of the main vehicle; i.e., the active hydrogen-containing resin, just before solubilization with water and acid as described above. Alternatively, it may be added to a partially solubilized resin kept at high enough solids so as to be sheared into the final composition. Additionally, it may be co-dispersed with polyepoxide-polyoxyalkylene-polyamine modifying anti-crater resins such as those described in U.S. Pat. No. 4,423,166. It may also be dispersed in a conventional pigment grinding vehicle such as those disclosed in U.S. Pat. No. 4,007,154, by a grinding or milling process, and be a component of a pigment paste.

The acid functional compound is added to and present in the electrodepositable composition in the form of an acid; i.e., it is not formed in situ by the decomposition or hydrolysis of a metal salt or catalyst. The acid functional compound is not reacted into the cationic resin backbone; i.e., to form an epoxy ester during the epoxy extension reaction.

The acid functional compound is usually present in the electrodepositable composition in an amount ranging from about 0.1 to 3.0 percent by weight based on weight of main vehicle resin solids; i.e., the active hydrogen-containing cationic resin and capped polyisocyanate curing agent, preferably from about 0.4 to 1.5 percent by weight based on weight of main vehicle resin solids.

The electrodepositable composition may optionally contain a coalescing solvent such as hydrocarbons, alcohols, esters, ethers and ketones. Examples of preferred coalescing solvents are alcohols, including polyols, such as isopropanol, butanol, 2-ethylhexanol, ethylene glycol and propylene glycol; ethers such as the monobutyl and monohexyl ethers of ethylene glycol; and ketones such as methyl isobutyl ketone and isophorone. The coalescing solvent is usually present in an amount up to about 40 percent by weight, preferably ranging from about 0.05 to 25 percent by weight based on total weight of the electrodepositable composition.

The electrodepositable composition of the present invention may further contain pigments and various other optional additives such as plasticizers, surfactants, wetting agents, defoamers, and anti-cratering agents.

Examples of suitable surfactants and wetting agents include alkyl imidazolines such as those available from Geigy Industrial Chemicals as GEIGY AMINE C, and acetylenic alcohols available from Air Products and Chemicals as SURFYNOL. Examples of defoamers include a hydrocarbon containing inert diatomaceous earth available from Crucible Materials Corp. as FOAMKILL 63. Examples of anti-cratering agents are polyepoxide-polyoxyalkylene-polyamine reaction products such as those described in U.S. Pat. No. 4,423,166. These optional ingredients, when present, are usually used in an amount up to 30 percent by weight, typically about 1 to 20 percent by weight based on weight of resin solids.

Suitable pigments include, for example, iron oxides, lead oxides, strontium chromate, carbon black, coal dust, titanium dioxide, talc, clay, silica, lead silicate, and barium sulfate, as well as color pigments such as cadmium yellow, cadmium red, chromium yellow, and the like. The pigment content of the aqueous dispersion, generally expressed as the pigment to resin (or pigment to binder) ratio (P/B) is usually about 0.05:1 to 1:1.

The composition of the present invention comprising the cationic resin, the capped polyisocyanate curing agent, the catalyst, the acid functional compound, and the optional additives mentioned above is used in an electrodeposition process in the form of an aqueous dispersion. By "dispersion" is meant a two-phase transparent, translucent, or opaque aqueous resinous system in which the resin, pigment, and water insoluble materials are in the dispersed phase while water and water soluble materials comprise the continuous phase. The dispersed phase has an average particle size less than about 10 microns, preferably less than 5 microns. The aqueous dispersion preferably contains at least about 0.05 and usually about 0.05 to 50 percent by weight resin solids, depending on the particular end use of the dispersion.

Addition of the acid functional compound to the electrodepositable composition of the present invention improves the cure response of the composition when it is used in an electrocoating process. By this is meant that the temperature range for curing of the electrodepositable composition of the present invention may be about 310 to 325° F. (154.5 to 162.7° C.), as opposed to 325 to 340° F. (162.7 to 171.1° C.)for conventional electrodepositable compositions at conventional organotin catalyst levels; i. e., about 0.5 to 1.0 percent by weight tin based on weight of resin solids. The composition of the present invention also demonstrates improved cure response as measured by solvent resistance when cured at underbake temperatures (about 310° F., 154.5° C.) compared to conventional electrodepositable compositions without the acid functional compound, once again at optimized organotin catalyst levels. Moreover, the cure rate is improved; i. e., at a given temperature, a deposited film of the present invention cures more quickly than a comparable film without the acid functional compound, as measured by rate of weight loss of a deposited film during baking. Alternatively, the amount of organotin catalyst can be reduced while maintaining cure at normal temperatures.

Addition of the acid functional compound to the electrodepositable composition of the present invention also improves the appearance of the composition when it is used in an electrocoating process. Cationic electrodeposition compositions are conventionally formulated with lead as either a pigment or a soluble lead salt. When these compositions also contain low levels of organotin catalysts; i. e., about 0.05 to 0.5 percent by weight tin based on weight of total resin solids, the cured deposited films exhibit a "fuzzy" or bristle-like appearance, particularly with aging of the electrodeposition bath. Addition of the acid functional compound to the electrodepositable composition in accordance with the present invention improves the appearance of cured electrodeposited films, eliminating the fuzzy appearance even with low levels of organotin catalyst in the composition.

In the process of electrodeposition the aqueous dispersion is placed in contact with an electrically conductive anode and cathode. Upon passage of an electric current between the anode and cathode while they are in contact with the aqueous dispersion, an adherent film of the electrodepositable composition will deposit in a substantially continuous manner on the cathode. The film will contain the active hydrogen-containing resin, the capped polyisocyanate curing agent, the tin catalyst, the acid functional compound, and the optional additives from the non-aqueous phase of the dispersion. Electrodeposition is usually carried out at a constant voltage in the range of from about 1 volt to several thousand volts, typically between 50 and 500 volts. Current density is usually between about 1.0 ampere and 15 amperes per square foot (10.8 to 161.5 amperes per square meter) and tends to decrease quickly during the electrodeposition process, indicating formation of a continuous self-insulating film. Any electroconductive substrate, especially metal substrates such as steel, zinc, aluminum, copper, magnesium or the like or an electroconductive coating applied earlier to a substrate can be coated with the electrodepositable composition of the present invention. Steel substrates are preferred. It is customary to pretreat the substrate with a phosphate conversion, usually a zinc phosphate conversion coating, followed by a rinse which seals the conversion coating.

After deposition, the coating is heated to cure the deposited composition. The heating or curing operation is usually carried out at a temperature in the range of from 250 to 400° F. (121.1 to 204.4° C.), preferably from 300 to 340° F. (148.8 to 171.1° C.) for a period of time ranging from 10 to 60 minutes. The thickness of the resultant film is usually from about 10 to 50 microns.

The invention will be further described by reference to the following examples. Unless otherwise indicated, all parts and percentages are by weight.

EXAMPLE I

Examples I-A to I-O illustrate the effect of adding various water immiscible acid functional compounds to a cationic electrodepositable composition in accordance with the present invention, compared to the effect of various non-acid functional compounds added to a cationic electrodepositable composition.

Example I-A (Control)

This example describes the preparation of a cationic electrodeposition bath containing no additive. A main vehicle (i. e., the active hydrogen-containing cationic resin and capped polyisocyanate curing agent) was prepared from the following ingredients:

| Ingredients | Parts by Weight |
| --- | --- |
| EPON 828[1] | 614.68 |
| Bisphenol A-ethylene oxide adduct (1:6 molar ratio) | 250.00 |
| Bisphenol A | 265.42 |
| Methyl isobutyl ketone | 59.48 |
| Ethyltriphenyl phosphonium iodide | 0.6 |
| Crosslinker[2] | 682.85 |
| Diketimine[3] | 56.01 |
| N-methyl ethanolamine | 48.68 |

[1] Polyglycidyl ether of Bisphenol A, available from Shell Oil and Chemical Co.
[2] The capped polyisocyanate crosslinker was prepared from the following mixture of ingredients:

| Ingredients | Parts by Weight |
| --- | --- |
| Polyisocyate[a] | 1325.00 |
| Methyl isobutyl ketone (MIBK) | 221.81 |
| 2-(2-Butoxyethoxy)ethanol | 162.23 |
| Dibutyltin dilaurate (DBTDL) | 0.2 |
| 2-Butoxy ethanol | 1063.62 |

[a] Mixture of diphenyl-4,4'-diisocyanate and polyphenyl polyisocyanate, available from Miles, Inc. as MONDUR MR.
The polyisocyanate, MIBK, and DBTDL were charged to a reaction flask under a nitrogen atmosphere. 2-(2-Butoxyethoxy)ethanol was added slowly allowing the reaction mixture to exotherm to a temperature between 45 and 50° C. Upon completion of the addition the reaction mixture was held at 50° C. for 30 minutes. 2-Butoxy ethanol was then added and the mixture allowed to exotherm to 110° C. and held there until infrared analysis indicated complete consumption of the isocyanate.
[3] Diketimine derived from diethylene triamine and methyl isobutyl ketone (MIBK) (73% solids in MIBK)

A reaction vessel was charged with the EPON 828, Bisphenol A-ethylene oxide adduct, Bisphenol A and MIBK. This mixture was heated under a nitrogen blanket to 125° C. Ethyl triphenylphosphonium iodide was then added and the reaction mixture allowed to exotherm to a temperature of about 145° C. The reaction was held at 145° C. for two hours and the epoxy equivalent weight was determined. At this point, the crosslinker, the diketimine, and N-methyl ethanolamine were added in succession. The reaction mixture exothermed and then a temperature of 132° C. was established and maintained for an hour. The resin mixture (1684 parts) was dispersed in aqueous medium by adding it to a mixture of 38.34 parts sulfamic acid and 1220.99 parts deionized water. The dispersion was further thinned with 657.63 parts deionized water and 666.28 parts deionized water in stages and vacuum stripped to remove organic solvent to yield a dispersion having a solids content of 41.2 percent and a particle size of 984 Angstroms.

A cationic electrodeposition bath was prepared from the following ingredients:

| Ingredients | Parts by Weight |
| --- | --- |
| Main vehicle prepared above | 1395.8 |
| Co-resin 1[1] | 168.2 |
| Butyl CARBITOL formal plasticizer[2] | 27.1 |
| Co-resin 2[3] | 73.9 |
| Deionized water | 1943.7 |
| E-6066[4] | 191.3 |

[1] An aqueous dispersion of a flexibilizer-flow control agent generally in accordance with U. S, Patent No. 4,423,166 was prepared for use with the electrodepositable composition. The flexibilizer-flow control agent was prepared from a polyepoxide (EPON 828) and a polyoxyalkylene-polyamine (JEFFAMINE D-2000 from Texaco Chemical Co.). The flexibilizer-flow control agent was dispersed in aqueous medium with the aid of lactic acid and the dispersion had a resin solids content of 36.2%.
[2] The reaction product of 2 moles of diethylene glycol butyl ether and 1 mole of formaldehyde, prepared as generally described in U. S. Patent No. 4,891,111.
[3] A cationic microgel prepared as generally described in Examples A and B of U. S. Patent No. 5,096,556, with the exception that acetic acid instead of lactic acid was used to disperse the soap of Example A, ethylene glycol butyl ether instead of MIBK was used as a solvent in the soap of Example A, and EPON 828 solution was added after stripping rather than before in Example B. The resin had a final solids content of 18.3%.
[4] A pigment paste commercially available from PPG Industries Inc., containing 27.2% titanium dioxide, 1.4% carbon black, 15.9% aluminum silicate, 5.7% basic lead silicate, and 3.8% dibutyltin oxide.

Examples I-B to I-O

Main vehicles and electrodeposition baths were prepared as generally described in Example I-A; however, various water immiscible acid functional compounds or non-acid functional compounds as reported in Table I below were added to the cationic main vehicle reaction mixture at 1% on main vehicle resin solids after the exotherm and one-hour hold at 132° C. described in the main vehicle preparation method above.

The baths for the above examples including the control were ultrafiltered, removing 20% of the total weight of the bath as ultrafiltrate and replacing the ultrafiltrate with deionized water. Zinc phosphate pretreated steel panels were immersed in the baths and electrocoated with the electrodepositable compositions at 275 volts for 2 min. at a bath temperature of 87–95° F. (30.5–35° C.). After rinsing with deionized water, the panels were baked for 30 minutes at 310° F. (154.5° C.), 325° F. (162.7° C.), or 340° F. (171.1° C.). Resulting film builds were about 0.9 mils (22.9 microns). The cured coatings were evaluated for appearance as measured by the surface profile or roughness ($R_A$) and for cure response as measured by acetone resistance and cure rate (TGA). The results are reported in Table I below.

TABLE I

| Example | Additive | $R_A$[1] | Acetone Resistance[2] | TGA[3] |
| --- | --- | --- | --- | --- |
| I-A (Control) | none | 14.5 | 20 | 22 |
| I-B | oleic acid | 8.3 | >100 | 77 |
| I-C | 9–11,9–12 octadecadienoic acid | 7.3 | >100 | 49 |
| I-D | stearic acid | 6.9 | >100 | 88 |
| I-E | linoleic acid | 6.8 | >100 | 64 |
| I-F | linolenic acid | 7.7 | >100 | 88 |
| I-G | 12-hydroxy stearic acid | 9.3 | >100 | 36 |
| | lauric acid | 11.5 | >100 | 102 |
| I-I | isodecanoic acid | 9.8 | >100 | 66 |
| I-J | hexanoic acid | 12.1 | >100 | 83 |
| I-K | isovaleric acid | 18.4 | >100 | 57 |
| I-L | dimer fatty acid | 8.2 | >100 | 60 |
| I-M (Comparative) | oleyl amine | 6.7 | 13 | 35 |

TABLE I-continued

| Example | Additive | $R_A^1$ | Acetone Resistance[2] | TGA[3] |
|---|---|---|---|---|
| I-N (Comparative) | oleyl alcohol | 9.8 | 45 | 43 |
| I-O (Comparative) | squalene | 9.8 | 55 | 38 |

[1]Data obtained from panels coated in baths aged two (2) weeks. Relative roughness of the coating surface is measured with a Surfanalyzer, Model 21-9010-01, Federal Products, Inc. The number reported is the Average Roughness, or the average vertical distance of any point on the surface from a centerline determined by a stylus moving across the surface, expressed in micro-inches; Lower numbers indicate greater smoothness. These data were obtained from panels cured for 30 minutes at 340° F. (171.1° C.).
[2]An acetone saturated cloth was firmly rubbed back and forth across the cured coating surface. The number reported is the number of double rubs required to expose the metal surface. These data were obtained from panels cured for 30 minutes at 310° F. (154.5° C.).
[3]Thermo-Gravimetric Analysis: The weight loss of a curing coating is monitored versus time for thirty (30) minutes at 325° F. (162.7° C.). The linear portion of the plot of the rate of change of the rate of weight loss versus time is recorded, expressed as percent weight loss per minute[2] times $10^3$ (% weight loss/min[2]) ($10^3$). The higher the values, the faster the weight loss and the greater the cure rate.

The data in Table I indicate that all the acid-functional compounds tested tend to improve cure, while other long-chain materials and highly unsaturated materials do not significantly improve cure. As the total number of carbons in the hydrocarbon chain of the acid-functional compound increases, the appearance of the cured coating tends to improve.

EXAMPLE II

The following examples (II-A to II-C) illustrate the effect of adding various levels of a water immiscible acid functional compound to a cationic electrodepositable composition in accordance with the present invention. The electrodeposition baths were prepared and zinc phosphate pretreated steel panels were coated and cured as in Example I. Results are reported in Table II below.

TABLE II

| Example | Additive Amount[1] | $R_A$ | Acetone Resistance | TGA |
|---|---|---|---|---|
| I-A (Control) | none | 14.5 | 20 | 22 |
| II-A | 0.5% oleic acid | 9.2 | >100 | 52 |
| I-B | 1.0% oleic acid | 8.3 | >100 | 77 |
| II-B | 2.0% oleic acid | 8.6 | >100 | 113 |
| II-C | 3.0% oleic acid | 9.2 | >100 | 185 |

[1]Amount reported is percent by weight based on main vehicle solids.

The data in Table II indicate that the effect of an acid functional compound on cure rate (TGA) is proportional to its level.

EXAMPLE III

The following examples (III-A and III-B) illustrate the effect of adding a water immiscible acid functional compound to a cationic electrodepositable composition containing a polyisocyanate crosslinking agent capped with a "sluggish" capping agent; i. e., a capping agent such as a secondary alcohol which does not readily uncap at standard cure temperatures. The compositions were prepared as in Example I, with the following exception. The capped polyisocyanate crosslinker was prepared from the following mixture of ingredients:

| Ingredients | Parts by Weight |
|---|---|
| Polyisocyanate[a] | 1325.00 |
| MIBK | 193.39 |
| Monomethyl ether of propylene glycol | 901.2 |
| DBTDL | 0.2 |

[a]MONDUR MR.

The polyisocyanate, MIBK, and DBTDL were charged to a reaction flask under a nitrogen atmosphere. The monomethyl ether of propylene glycol was added slowly allowing the reaction mixture to exotherm to a temperature between 100 and 110° C. Upon completion of the addition the reaction mixture was held at 110° C. until infrared analysis indicated complete consumption of the isocyanate.

The crosslinker was incorporated into the main vehicle as in Example I-A, except at 31% solids on solids instead of at 34% solids on solids.

The electrodepositable composition of Example III-A contained no acid functional materials, while that of Example III-B contained 1% oleic acid by weight, based on weight of main vehicle resin solids. The electrodeposition baths were prepared and zinc phosphate pretreated steel panels were coated and cured as in Example I unless otherwise indicated. Results are reported in Table III below.

TABLE III

| Example | Additive Amount | $R_A$ | Acetone Resistance 310° F.[1] | Acetone Resistance 340° F.[2] | TGA[3] 325° F. | TGA[4] 340° F. |
|---|---|---|---|---|---|---|
| III-A (control) | none | 6.7 | 1 | 45 | 28 | 55 |
| III-B | 1.0% | 6.1 | 95 | >100 | 38 | 125 |

[1]These data were obtained from coated panels cured for 30 minutes at 310° F. (154.5° C.).
[2]These data were obtained from coated panels cured for 30 minutes at 340° F. (171.1° C.).
[3]These data were obtained from coated panels cured for 30 minutes at 325° F. (162.7° C.).
[4]These data were obtained from coated panels cured for 30 minutes at 340° F. (171.1° C.).

The data in Table III indicate that acid functional compounds improve the cure rate (TGA) in a system containing a polyisocyanate crosslinking agent capped with a "sluggish" capping agent. Acetone resistance and appearance are also improved.

EXAMPLE IV

The following examples (IV-A and IV-B) illustrate the effect of adding water immiscible acid functional compound to a cationic electrodepositable composition containing dioctyltin oxide instead of dibutyltin oxide, at equal tin levels, as the catalyst.

Example IV-A

This example demonstrates the preparation of a cationic electrodepositable composition containing dioctyltin oxide catalyst and no acid functional compound.

A pigment paste was prepared from the following ingredients:

| Ingredients | Parts by Weight |
| --- | --- |
| Pigment grinding vehicle[1] | 338.0 |
| Deionized water | 507.1 |
| Titanium dioxide[2] | 564.0 |
| Aluminum silicate[3] | 330.0 |
| Carbon Black[4] | 28.0 |
| Basic lead silicate[5] | 118.0 |
| Dioctyltin oxide | 114.9 |

[1]The pigment grinding vehicle was prepared by first preparing a quaternizing agent followed by reacting the quaternizing agent with an epoxy resin. The quaternizing agent was prepared as follows:

| Ingredients | Solution weight (grams) | Solid weight |
| --- | --- | --- |
| 2-Ethylhexanol half-capped toluene diisocyanate in MIBK | 320 | 304 |
| Dimethylethanolamine (DMEA) | 87.2 | 87.2 |
| Aqueous lactic-acid solution | 117.6 | 58.2 |
| 2-Butoxyethanol | 39.2 | — |

The 2-ethylhexanol half-capped toluene diisocyanate was added to the DMEA in a suitable reaction vessel at room temperature. The mixture exothermed and was stirred for one hour at 80° C. The aqueous lactic acid solution was then charged followed by the addition of 2-butoxyethanol. The reaction mixture was stirred for about one hour at 65° C. to form the quaternizing agent.
The pigment grinding vehicle was prepared as follows:

| Ingredients | Solution weight (grams) | Solid weight |
| --- | --- | --- |
| EPON 829[a] | 710 | 682 |
| Bisphenol A | 289.6 | 289.6 |
| 2-Ethylhexanol half-capped toluene diisocyanate in MIBK | 406 | 386.1 |
| Quaternizing agent described above | 496.3 | 421.9 |
| Deionized water | 71.2 | — |
| 2-Butoxyethanol | 1490 | — |

[a]Diglycidyl ether of Bisphenol A available from Shell Oil and Chemical Co.
The EPON 829 and Bisphenol A were charged under a nitrogen atmosphere to a suitable reactor and heated to 150 to 160° C. to initiate an exotherm. The reaction mixture was permitted to exotherm for one hour at 150 to 160° C. The reaction mixture was then cooled to 120° C. and the 2-ethylhexanol half-capped toluene diisocyanate added. The temperature of the reaction mixture was held at 110 to 120° C. for one hour followed by the addition of the 2-butoxyethanol. The reaction mixture was then cooled to 85 to 90° C., homogenized and charged with water followed by the quaternizing agent. The temperature of the reaction mixture was held at 80 to 85° C. until an acid value of about 1 was obtained. The final product had a solids content of about 57.1%.
[2]Available from E. I. Du Pont de Nemours and Co. as R-900.
[3]Available from Engelhard Corp. as ASP-200.
[4]Available from the Columbian division of Cities Service Co. as Raven 410.
[5]Available from Eagle-Picher Industries, Inc. as EP202.

The pigment paste was sand milled to a Hegman reading of 7.

A cationic electrodeposition bath was prepared from the following ingredients:

| Ingredients | Parts by Weight |
| --- | --- |
| Main vehicle of Example I-A | 1456.5 |
| Co-resin 1 of Example I-A | 178.0 |
| Butyl CARBITOL formal plasticizer | 28.2 |
| Co-resin 2 of Example I-A | 77.6 |
| Deionized water | 1865.6 |
| Pigment paste described above | 194.1 |

Example IV-B

This example demonstrates the preparation of a cationic electrodepositable composition containing dioctyltin oxide catalyst and a water immiscible acid functional compound at 1 weight percent on main vehicle solids.

A cationic electrodeposition bath was prepared from the following ingredients:

| Ingredients | Parts by Weight |
| --- | --- |
| Main vehicle of Example I-A | 971.0 |
| Main vehicle of Example II-C | 454.2 |
| Co-resin 1 of Example I-A | 178.0 |
| Butyl CARBITOL formal plasticizer | 28.2 |
| Co-resin 2 of Example I-A | 77.6 |
| Deionized water | 1896.9 |
| Pigment paste of Example IV-A | 194.1 |

The electrodeposition baths of Examples IV-A and IV-B were prepared and zinc phosphate pretreated steel panels were coated and cured as in Example I. Results are reported in Table IV below.

TABLE IV

| Example | Additive Amount | $R_A$ | Acetone Resistance | TGA |
| --- | --- | --- | --- | --- |
| IV-A (Control) | none | 9.8 | >100 (coating softened) | 56 |
| IV-B | 1.0% oleic acid | 9.7 | >100 (no softening) | 147 |

The data in Table IV indicate that addition of a water immiscible acid functional compound to a cationic electrodepositable composition containing dioctyltin oxide clearly improves the cure rate, as shown by the marked increase in TGA.

EXAMPLE V

The following examples (V-A and V-B) illustrate the effect of reacting a water immiscible acid functional compound into the main vehicle at 1% on main vehicle solids, forming an epoxy ester, compared to post-adding the acid functional compound to the cationic electrodepositable composition.

Example V-A

This example describes the preparation of a cationic electrodeposition bath containing 1% oleic acid on main vehicle solids, post-added to the fully reacted resin. A main vehicle was prepared from the following ingredients:

| Ingredients | Parts by Weight |
| --- | --- |
| EPON 828 | 1844.03 |
| Bisphenol A-ethylene oxide adduct (1:6 molar ratio) | 75.00 |
| Bisphenol A | 796.27 |
| Methyl isobutyl ketone | 69.19 |
| Ethyltriphenyl phosphonium iodide | 1.80 |
| Bisphenol A-ethylene oxide adduct (1:6 molar ratio) | 675.00 |
| Methyl isobutyl ketone | 10.98 |
| Crosslinker of Example I-A | 2049.23 |
| Diketimine of Example I-A | 168.02 |
| N-methyl ethanolamine | 146.03 |

A reaction vessel was charged with the EPON 828, the initial charge of Bisphenol A-ethylene oxide adduct, Bisphenol A and the initial charge of MIBK. This mixture was heated under a nitrogen blanket to 125° C. Ethyl triphenylphosphonium iodide was then added and the reaction mixture allowed to exotherm to a temperature of about 145° C. The reaction was held at 145° C. for two hours and the second charge of Bisphenol A-ethylene oxide adduct was added and the epoxy equivalent weight was determined. At this point, the second charge of MIBK, the crosslinker, the diketimine, and N-methyl ethanolamine were added in succession. The reaction mixture exothermed and then a temperature of 132° C. was established and maintained for an hour. The resin mixture (1500 parts) was dispersed in aqueous medium by adding it to a mixture of 34.72 parts sulfamic acid and 1145.23 parts deionized water. After five minutes 14.25 parts oleic acid was added to the high solids dispersion and further mixed for 30 minutes. The dispersion was further thinned with 581.29 parts deionized water and 603.38 parts deionized water in stages and vacuum stripped to remove organic solvent to yield a dispersion having a solids content of 42.6 percent and a particle size of 861 Angstroms.

A cationic electrodeposition bath was prepared from the following ingredients:

| Ingredients | Parts by Weight |
| --- | --- |
| Main vehicle prepared above | 1349.9 |
| Co-resin 1 of Example I-A | 168.2 |
| Butyl CARBITOL formal plasticizer | 27.1 |
| Co-resin 2 of Example I-A | 73.9 |
| Deionized water | 1989.6 |
| E-6066 | 191.3 |

Example V-B

This example describes the preparation of a cationic electrodeposition bath containing 1 oleic acid on main vehicle solids, reacted into the resin during the epoxy extension stage. A main vehicle was prepared from the following ingredients:

| Ingredients | Parts by Weight |
| --- | --- |
| EPON 828 | 614.68 |
| Bisphenol A-ethylene oxide adduct (1:6 molar ratio) | 250.00 |
| Bisphenol A | 265.42 |
| Methyl isobutyl ketone | 60.45 |
| Ethyltriphenyl phosphonium iodide | 0.6 |
| Oleic acid | 18.48 |
| Crosslinker of Example I-A | 683.08 |
| Diketimine of Example I-A | 56.56 |
| N-methyl ethanolamine | 48.68 |

A reaction vessel was charged with the EPON 828, Bisphenol A-ethylene oxide adduct, Bisphenol A, oleic acid, and the MIBK. This mixture was heated under a nitrogen blanket to 125° C. Ethyl triphenylphosphonium iodide was then added and the reaction mixture allowed to exotherm to a temperature of about 145° C. The reaction was held at 145° C. for two hours and the epoxy equivalent weight was determined. At this point, the crosslinker, the diketimine, and N-methyl ethanolamine were added in succession. The reaction mixture exothermed and then a temperature of 132° C. was established and maintained for an hour. The resin mixture (1700 parts) was dispersed in aqueous medium by adding it to a mixture of 38.31 parts sulfamic acid and 1219.38 parts deionized water. The dispersion was further thinned with 657.26 parts deionized water and 665.91 parts deionized water in stages and vacuum stripped to remove organic solvent to yield a dispersion having a solids content of 43.1 percent and a particle size of 870 Angstroms.

A cationic electrodeposition bath was prepared as in Example V-A except that the main vehicle of Example V-B was used in place of the main vehicle of Example V-A.

The electrodeposition baths of Examples V-A and V-B were prepared and zinc phosphate pretreated steel panels were coated and cured as in Example I. Results are reported in Table V below.

TABLE V

| Example | Additive Amount | $R_A$ | Acetone Resistance | TGA |
| --- | --- | --- | --- | --- |
| V-A | 1.0% oleic acid (post-add) | 9.0 | >100 | 77 |
| V-B | 1.0% oleic acid (reacted in) | 10.6 | 30 | 25 |

The data in Table V indicate that post-addition of a water immiscible acid functional compound to the cationic electrodepositable composition of Example V provides better appearance, cure, and cure rate than does reaction of the cationic resin with the water immiscible acid functional compound.

EXAMPLE VI

The following examples (VI-A to VI-G) illustrate the effect of adding a water immiscible acid functional compound to the cationic electrodepositable composition with respect to the levels of tin catalyst required for appearance and cure.

Example VI-A

This example describes the preparation of a cationic electrodeposition bath containing 1.45% dibutyltin oxide (DBTO) on total resin solids (0.69% tin on total resin solids), and no water immiscible acid functional compound.

A pigment paste was prepared from the following ingredients:

| Ingredients | Parts by Weight |
| --- | --- |
| Pigment grinding vehicle of Example IV-A | 1515.5 |
| Deionized water | 2659.0 |
| Titanium dioxide | 2712.5 |
| Aluminum silicate | 1582.5 |
| Carbon Black | 134.5 |
| Basic lead silicate | 570.5 |

The paste was sand milled to a Hegman reading of 7.

A catalyst paste was prepared from the following ingredients:

| Ingredients | Parts by Weight |
| --- | --- |
| Pigment grinding vehicle of Example IV-A | 137.9 |
| Dibutyltin oxide | 200 |
| Deionized water | 268.2 |

The paste was sand milled to a Hegman reading of 7.

A cationic electrodeposition bath was prepared from the following ingredients:

| Ingredients | Parts by Weight |
| --- | --- |
| Main vehicle of Example I-A | 1391.1 |
| Co-resin 1 of Example I-A | 168.2 |
| Butyl CARBITOL formal plasticizer | 27.1 |
| Co-resin 2 of Example I-A | 73.9 |
| Deionized water | 1934.7 |
| Pigment paste described above | 172.4 |
| Catalyst paste described above | 32.6 |

Example VI-B

This example describes the preparation of a cationic electrodeposition bath containing 1.45% DBTO on total resin solids (0.696 tin on total resin solids), and 1% water immiscible acid functional compound on main vehicle solids.

A cationic electrodeposition bath was prepared from the following ingredients:

| Ingredients | Parts by Weight |
| --- | --- |
| Main vehicle of Example V-A | 5379.5 |
| Co-resin 1 of Example I-A | 670.3 |
| Butyl CARBITOL formal plasticizer | 107.8 |
| Co-resin 2 of Example I-A | 294.7 |
| Deionized water | 7928.0 |
| Pigment paste of Example VI-A | 689.5 |
| Catalyst paste of Example VI-A | 130.2 |

EXAMPLE VI-C to VI-G

These examples describe the preparation of various cationic electrodeposition baths containing reduced levels of DBTO and 1% acid functional compound on main vehicle solids. The baths were prepared by diluting the bath of Example VI-B, containing 1.45% DBTO on total resin solids, with a bath containing no DBTO, prepared from the following ingredients:

| Ingredients | Parts by Weight |
| --- | --- |
| Main vehicle of Example V-A | 4049.8 |
| Co-resin 1 of Example I-A | 504.6 |
| Butyl CARBITOL formal plasticizer | 81.2 |
| Co-resin 2 of Example I-A | 221.8 |
| Deionized water | 5970.2 |
| Pigment paste of Example VI-A | 572.4 |

| Example | Parts by weight (Bath of Example VI-B) | Parts by weight (DBTO-free Bath) | % DBTO (tin) on total resin solids |
| --- | --- | --- | --- |
| VI-C | 2830.0 | 970.0 | 1.08 (0.515) |
| VI-D | 2359.0 | 1441.0 | 0.9 (0.429) |
| VI-E | 1835.0 | 1965.0 | 0.7 (0.334) |
| VI-F | 1310.0 | 2490.0 | 0.5 (0.238) |
| VI-G | 786.0 | 3014.0 | 0.3 (0.143) |

The electrodeposition baths of Examples VI-A to VI-G were prepared and zinc phosphate pretreated steel panels were coated and cured as in Example I. Results are reported in Table VI below.

TABLE VI

| Example | Additive Amount (oleic acid) | % DBTO (tin) on total resin solids | $R_A$ | Acetone Resistance | TGA |
| --- | --- | --- | --- | --- | --- |
| VI-A | 0 | 1.45 (0.691) | 10.7 | >100 (extremely soft) | 32 |
| VI-B | 1.0% | 1.45 (0.691) | 6.8 | >100 (very slightly soft) | 170 |
| VI-C | 1.0% | 1.08 (0.515) | 7.7 | >100 (soft) | 122 |
| VI-D | 1.0% | 0.9 (0.429) | 7.4 | >100 (very soft) | 82 |
| VI-E | 1.0% | 0.7 (0.334) | 8.6 | >100 (extremely soft) | 63 |
| VI-F | 1.0% | 0.5 (0.238) | 9.8 | 75 | 43 |
| VI-G | 1.0% | 0.3 (0.143) | 9.4 | 40 | 27 |

The data in Table VI indicate that the appearance of a coating is improved when the composition contains a water immiscible acid functional compound, for all levels of catalyst tested. Cure, as measured by acetone resistance, is equal for the composition containing 0.7% DBTO with a water immiscible acid functional compound and the composition containing 1.45% DBTO with no acid functional compound. Cure rate as measured by TGA is slightly better for a composition containing 0.5% DBTO with a water immiscible acid functional compound than the composition containing 1.45% DBTO with no water immiscible acid functional compound.

EXAMPLE VII

The following examples (VII-A and VII-B) illustrate the effect of adding a water immiscible acid functional compound to a lead-free cationic electrodepositable primer composition.

Example VII-A

This example describes the preparation of a cationic electrodeposition primer bath containing no lead and no water immiscible acid functional compound.

A pigment paste was prepared from the following ingredients:

| Ingredients | Parts by Weight |
| --- | --- |
| Pigment grinding vehicle of Example IV-A | 1167.8 |
| Deionized water | 2011.8 |
| Aluminum silicate | 2449.6 |
| Carbon Black | 1428.8 |
| Titanium dioxide | 121.6 |

The pigment paste was sand milled to a Hegman reading of 7.

A cationic electrodeposition bath was prepared from the following ingredients:

| Ingredients | Parts by Weight |
| --- | --- |
| Main vehicle of Example I-A | 1462.5 |
| Co-resin 1 of Example I-A | 178.7 |
| Butyl CARBITOL formal plasticizer | 28.4 |
| Co-resin 2 of Example I-A | 77.1 |
| Deionized water | 1857.7 |
| Pigment paste described above | 195.6 |
| Catalyst paste of Example VI-A | 23.8 |

Example VII-B

This example describes the preparation of a cationic electrodeposition primer bath containing no lead and 1% water immiscible acid functional compound on main vehicle solids.

A cationic electrodeposition bath was prepared from the following ingredients:

| Ingredients | Parts by Weight |
| --- | --- |
| Main vehicle of Example V-A | 1414.3 |
| Co-resin 1 of Example I-A | 178.7 |
| Butyl CARBITOL formal plasticizer | 28.4 |
| Co-resin 2 of Example I-A | 77.1 |
| Deionized water | 1905.9 |
| Pigment paste of Example VII-A | 195.6 |
| Catalyst paste of Example VI-A | 23.8 |

The electrodeposition baths of Examples VII-A and VII-B were prepared and zinc phosphate pretreated steel panels were coated and cured as in Example I. Results are reported in Table VII below.

TABLE VII

| Example | Additive Amount | $R_A^1$ | Acetone Resistance[2] | TGA[3] | TGA[4] |
| --- | --- | --- | --- | --- | --- |
| VII-A (control) | none | 5.61 | 5 | 13 | 48 |
| VII-B | 1.0% | 8.45 | >100 | 119 | 315 |

[1]These data were obtained from coated panels cured for 30 minutes at 340° F. (171.1° C.)
[2]These data were obtained from coated panels cured for 30 minutes at 310° F. (154.5° C.)
[3]These data were obtained from coated panels cured for 30 minutes at 325° F. (162.7° C.)
[4]These data were obtained from coated panels cured for 30 minutes at 340° F. (171.1° C.)

The data in Table VII indicate that addition of water immiscible acid functional compounds to lead-free electrodepositable compositions improve the cure as measured by acetone resistance and TGA, despite the absence of lead as an auxiliary isocyanate decapping catalyst.

We claim:

1. An electrodepositable composition comprising:
   (a) an active hydrogen-containing cationic resin;
   (b) a capped polyisocyanate curing agent;
   (c) an organotin-containing catalyst selected from the group consisting of dioctyltin oxide and dibutyltin oxide; and
   (d) a water-immiscible acid having a carbon chain of at least five carbon atoms; said water-immiscible acid being present in the composition in an amount effective to improve the cure response of the electrodepositable composition when it is used in an electrocoating process.

2. The electrodepositable composition of claim 1 in which the cationic resin is derived from a polyepoxide.

3. The electrodepositable composition of claim 2 in which the polyepoxide is a polyglycidyl ether of a polyhydric alcohol.

4. The electrodepositable composition of claim 2 wherein the active hydrogen-containing cationic resin has cationic salt groups which are amine salt groups.

5. The electrodepositable composition of claim 4 in which the amine salt groups are derived from basic nitrogen groups neutralized with an acid selected from the group consisting of formic acid, acetic acid, lactic acid, phosphoric acid, sulfamic acid, and mixtures thereof.

6. The electrodepositable composition of claim 1 in which the acid functional compound is a carboxylic acid.

7. The electrodepositable composition of claim 1 in which the acid functional compound has a hydrocarbon chain of from about 9 to 34 carbon atoms.

8. The electrodepositable composition of claim 7 in which the acid functional compound has a hydrocarbon chain of from about 15 to 19 carbon atoms.

9. The electrodepositable composition of claim 1 in which the hydrocarbon chain is aliphatic.

10. The electrodepositable composition of claim 1 in which the hydrocarbon chain is saturated.

11. The electrodepositable composition of claim 1 in which the hydrocarbon chain is unsaturated.

12. The electrodepositable composition of claim 1 in which the acid functional compound is selected from the group consisting of 9–11 octadecadienoic acid, 9–12 octadecadienoic acid, lauric acid, stearic acid, isodecanoic acid, linolenic acid, oleic acid, and mixtures thereof.

13. The electrodepositable composition of claim 12 in which the acid functional compound is oleic acid.

14. The electrodepositable composition of claim 1 in which the organotin-containing catalyst is present in amounts of about 0.05 to 1 percent tin by weight, based on total weight of resin solids of active hydrogen-containing cationic resin and capped polyisocyanate curing agent.

15. The electrodepositable composition of claim 14 further comprising lead compound.

16. The electrodepositable composition of claim 1 which is curable at a temperature range of about 300 to 340° F. (148.8 to 171.1° C.).

17. The electrodepositable composition of claim 1 wherein the acid functional compound is present in an amount ranging from about 0.1 to 3.0 percent by weight based on the weight of the resin solids of the active hydrogen-containing cationic resin and the capped polyisocyanate curing agent as the main vehicle.

18. The electrodepositable composition of claim 17 wherein the acid functional compound is present in an amount ranging from about 0.4 to 1.5 percent by weight based on the weight of the main vehicle resin solids as post-added so that a reduced amount of the organotin-containing catalyst is present in amounts of about 0.05 to 0.5 percent tin by weight, based on total weight of resin solids of active hydrogen-containing cationic resin and capped polyisocyanate curing agent.

19. The electrodepositable composition of claim 18, wherein the acid functional compound is present and remains unreacted with the cationic resin backbone of the active hydrogen-containing cationic resin in the electrodepositable composition to enhance cure response of the electrodepositable composition when the organotin-containing catalyst activates cure of the electrodepositable composition.

20. The electrodepositable composition of claim 1 wherein the polyisocyanate curing agent is present in the amount ranging from about 5 to 60 percent by weight based on total weight of resin solids.

21. The electrodepositable composition of claim 1 wherein the polyisocyanate curing agent is present in the amount ranging from about 25 to 50 percent by weight based on total weight of resin solids.

* * * * *